US010691753B2

(12) United States Patent
Ogren et al.

(10) Patent No.: US 10,691,753 B2
(45) Date of Patent: Jun. 23, 2020

(54) MEMORY REDUCED STRING SIMILARITY ANALYSIS

(71) Applicant: Oracle International Corporation, Redwood Shores, CA (US)

(72) Inventors: Philip Victor Ogren, Boulder, CO (US); Stephen Joseph Green, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 15/962,020

(22) Filed: Apr. 25, 2018

(65) Prior Publication Data
US 2019/0332722 A1    Oct. 31, 2019

(51) Int. Cl.
| G06F 16/901 | (2019.01) |
| G06F 16/903 | (2019.01) |
| G06F 40/126 | (2020.01) |
| G06K 9/62 | (2006.01) |

(52) U.S. Cl.
CPC .... *G06F 16/90344* (2019.01); *G06F 16/9014* (2019.01); *G06F 16/9024* (2019.01); *G06F 40/126* (2020.01); *G06K 9/6215* (2013.01)

(58) Field of Classification Search
CPC ............ G06F 16/9014; G06F 16/9024; G06F 16/90344; G06F 40/126; G06F 40/194; G06K 9/6215
See application file for complete search history.

(56) References Cited

U.S. PATENT DOCUMENTS

| 7,881,544 B2* | 2/2011 | Bashyam | H03M 7/40 382/232 |
| 8,321,400 B2* | 11/2012 | Gosse | G06F 16/951 707/708 |
| 8,572,126 B2* | 10/2013 | Flor | G06F 16/322 707/797 |
| 2005/0198062 A1* | 9/2005 | Shapiro | G06F 16/2282 707/999.102 |

(Continued)

OTHER PUBLICATIONS

U. Germann; "Tightly Packed Tries: How to Fit Large Models into Memory, and Make them Load Fast, Too"; Proceedings of the NAACL HLT Workshop on Software Engineering, Testing, and Quality Assurance for Natural Language Processing; pp. 31-39; Boulder, Colorado; Jun. 2009.

*Primary Examiner* — Scott A. Waldron
(74) *Attorney, Agent, or Firm* — Potomac Law Group, PLLC (57) ABSTRACT

Embodiments perform string similarity analysis by receiving candidate strings of a collection to be searched and transforming each candidate string into one or more features. Embodiments generate a feature index that maps each of the features to one or more candidate strings which include the features, and transform the feature index into a low-memory index by byte encoding a sorted integer array into an encoded byte array. The transforming into a low-memory index further includes hashing each feature to an integer value and storing using a tightly-packed map a hashed value to feature identification ("ID") mapping, using a first tightly-packed list to map each of the feature IDs to one or more candidate strings which include the features, and using a second tightly-packed list to store the feature IDs.

20 Claims, 5 Drawing Sheets

(56) References Cited

U.S. PATENT DOCUMENTS

2014/0067363 A1 3/2014 Ogren et al.
2014/0067728 A1* 3/2014 Ogren .................. G06K 9/6256
                                                    706/12

* cited by examiner

MEMORY REDUCED STRING SIMILARITY ANALYSIS

FIELD

One embodiment is directed generally to a computer based string similarity analysis, and in particular to a computer based string similarity analysis with a reduced need for memory.

BACKGROUND INFORMATION

A string metric or string distance function is a metric that measures distance ("inverse similarity") between two text strings for approximate string matching. A string metric provides a number indicating an algorithm-specific indication of distance. The most widely known string metric is a rudimentary one referred to as the "Levenshtein" distance. String matching may be used in a variety of applications including data quality, searching, clustering, or other approaches to data analysis. In a simple example, two strings may differ in ways such as the perturbation of a single character. For instance, the strings "Mississippi" and "Mississippe" differ with respect to a single character. However, differences between related strings may be much more complicated.

String similarity search or analysis uses a string metric and can be thought of as the problem of searching through a list of string values (e.g., people or place names, controlled vocabularies, etc.) for a given input string. Known solutions for string similarity search have generally involved repurposing general-purpose search engine technology or employing database technology for searching values in a given column. The former is better suited for indexing and retrieving documents and web pages and can have suboptimal search results for the string similarity task because they rely heavily on prefix filtering. The latter is well suited for the task, generally speaking, except that it introduces latency by requiring a round-trip to a database server. In general, both of these known solutions introduce latency which makes a search-as-you-type (i.e., search results update as a user types the input query) use case much more challenging.

SUMMARY

Embodiments perform string similarity analysis by receiving candidate strings of a collection to be searched and transforming each candidate string into one or more features. Embodiments generate a feature index that maps each of the features to one or more candidate strings which include the features, and transform the feature index into a low-memory index by byte encoding a sorted integer array into an encoded byte array. The transforming into a low-memory index further includes hashing each feature to an integer value and storing using a tightly-packed map a hashed value to feature identification ("ID") mapping, using a first tightly-packed list to map each of the feature IDs to one or more candidate strings which include the features, and using a second tightly-packed list to store the feature IDs.

DETAILED DESCRIPTION

One embodiment generates a low-memory index of the features of a collection of strings to be searched using a tightly-packed list structure and a tightly-packed map data structure. The low-memory index is then used with a string similarity search that uses a guaranteed rank threshold to provide an optimized and reduced memory search.

Figure 1:
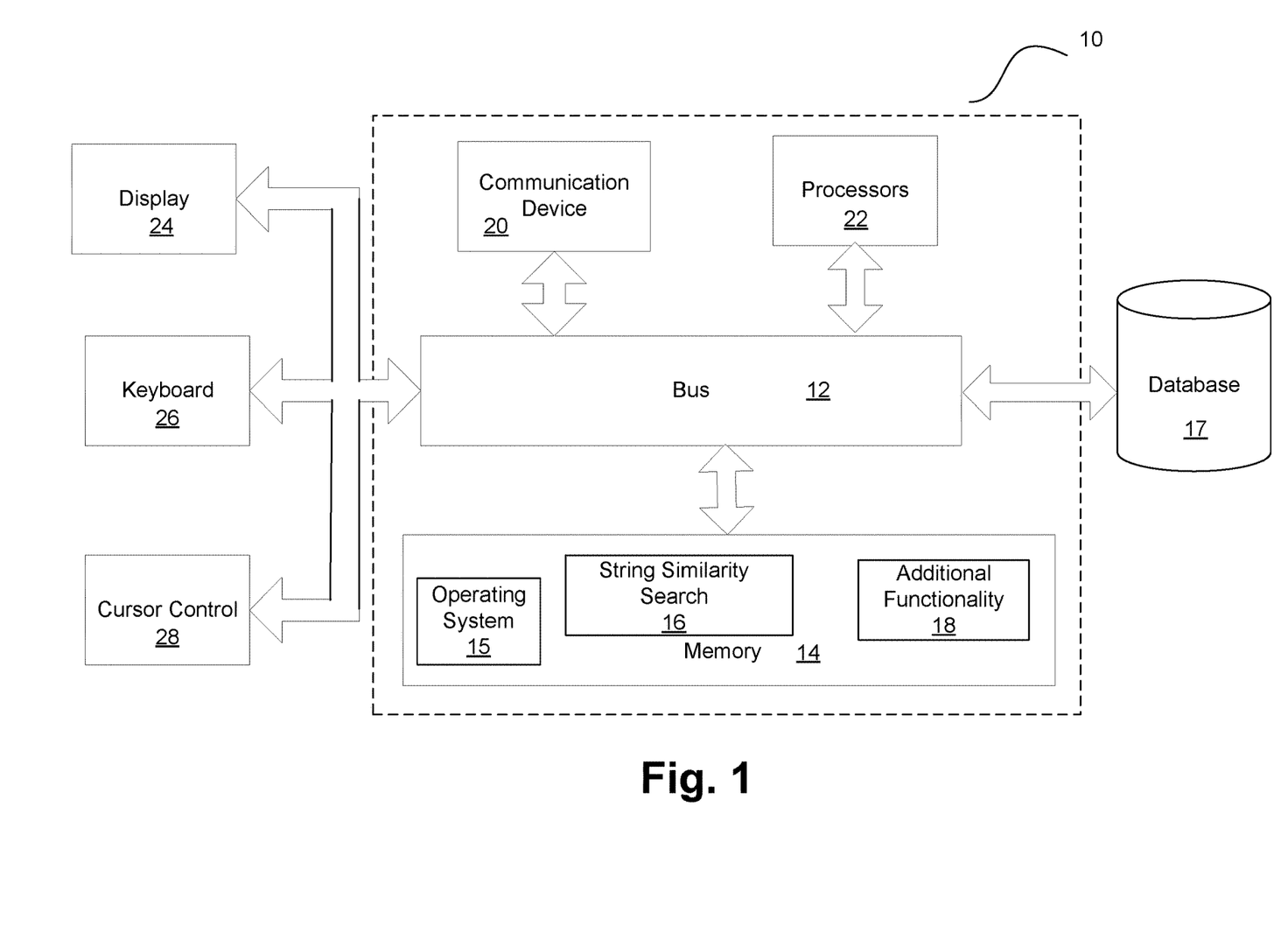
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a string similarity search module 16 that provides reduced memory string similarity search, and all other functionality disclosed herein. System 10 can be part of a larger system that uses string similarity search, such as a search engine. Therefore, system 10 can include one or more additional functional modules 18 to include the additional functionality, such as a document search engine for searching locally or remotely stored documents.

A database 17 is coupled to bus 12 to provide centralized storage for modules 16 and 18 and store data sources, documents, etc. that can form the collection of strings to be searched. In one embodiment, database 17 is a relational database management system ("RDBMS") that can use Structured Query Language ("SQL") to manage the stored data. Database 17 may be local to the other components of FIG. 1, or remote such as on the cloud.

In one embodiment, particularly when there are a large number of documents to be searched, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations. The applications and computing system 10 may be configured to operate with or be implemented as a cloud-based networking system, a software-as-a-service ("SaaS") architecture, or other type of computing solution.

As disclosed, an approach to the calculation of a similarity metric for performing string similarity search may be utilized that provides a quantitative value of relative similarity between an input string and one or more strings in a collection of strings to be searched. Embodiments can selectively reduce the total number of times a similarity metric is required to be calculated when performing a search using, for example, candidate filtering, feature index pruning, or a guaranteed rank threshold algorithm. Searches may be performed quickly so that highly relevant search results are returned in ranked order of similarity in near instant results that facilitate a search-as-you-type functionality in which new results are returned as each new character is provided in an input string.

In embodiments, the collection of strings may correspond to different types of data and may be stored in database 17 of FIG. 1 or remotely stored. For example, the strings may include text, numbers, signals, or other data. In one embodiment, the strings may correspond with textual characters such as standard ASCII characters (e.g., including alphanumeric characters and symbols). For example, the strings may correspond to product information (e.g., product information contained in legacy databases maintained by businesses). In other embodiments, the strings may represent or correspond to other data sources and/or contexts such as documents, web pages, biological sequencing (e.g., DNA sequencing), random data sets, scientific data, directory information, or any other context where a collection of strings is to be searched using a search query.

Generally, as disclosed, embodiments perform string analysis by determining the similarity (e.g., a quantitative similarity metric) between an input string and one or more strings from a collection of strings to be searched. For example, an input string and a string from a collection that are completely identical may have a similarity metric of 100% or 1, while an input string and a string from a collection that are completely dissimilar may have a similarity metric of 0% or 0.

In embodiments, the strings (e.g., either or both of strings from a collection to be searched as well as an input string) are represented as a set of features. A feature may be any characteristic of the string that can be derived from the string or the data record from which the string is drawn. A feature can leverage metadata associated with a string.

In one embodiment, each feature that is used to represent a string can be in the form of a character n-gram. Character n-grams are fixed-width sequences of contiguous characters. Character n-grams are generally easy to compute, domain independent, and particularly suited to the context of text matching. For example, one type of n-gram that may be used to generate features is a trigram. A trigram has a fixed-width sequence of three characters. Additionally, begin-of-word and end-of-word markers may also be used. Therefore, a string may be represented by features corresponding to successive three character sequences of the string.

For example, consider the string "RES 10 OHM ¼ WATT 5%." The string may be represented by the following trigrams: <B>re, res, es<E>, <B>10, 10<E>, <B>oh, ohm, hm<E>, <B>1/, ¼, /4<E>, <B>wa, wat, att, tt<E>, <B>5%, 5%<E>, where <B> indicates a begin-of-word and <E> indicates an end-of-word in the feature. The representation of the string as n-gram features may be domain independent such that the feature generation may be applied without deference to the source or form of the data of the string. Therefore, feature generation may be applied to a variety of domains quite easily. Further, other variations of n-grams may be used as features such that n may be 2, 4, or some other integer value. Further, other features may be used such as words, character prefixes or suffixes, or arbitrary features such as consonant n-grams that are created by first removing the vowels from a string.

In an embodiment, a string can be represented as one or more features based on a word-level token found in a string. For example, the generation of features may leverage domain-specific knowledge. One example may be utilizing knowledge of how product part numbers or telephone numbers are constructed. In this regard, a listing of ten digit telephone numbers may utilize a known rule that the first three digits represent the area code for the number. Therefore, the first three digits of each number may be used to generate a feature corresponding to the area code. The remainder of the number may be processed utilizing, for example, a different feature representation, such as an n-gram or other feature with the understanding those numbers may be random or lack the underlying meaning attributed to the area code. Additionally or alternatively, linguistic knowledge, taxonomy, grammatical, syntax, or other schema data may be used to generate features. Accordingly, features may reflect heuristics for common abbreviation strategies, textual structure features, or other linguistic knowledge may be used to represent strings as features.

One embodiment provides a weight to each feature to determine how much a feature contributes (or does not contribute) to the string analysis. Examples of feature weighting include giving each feature a score of 1.0 so that each feature contributes equally in the analysis, using frequency information regarding the feature from the content of the collection to weight the feature (e.g., using the negative log of the probability), or using the frequency rank of the feature.

One particular example of a weighting technique may include using a beta distribution over the frequency rank. In this context, high frequency features are given very little weight as the high frequency features tend to be uninformative. Very low frequency features may also be given very little weight because they tend to be noisy. As a result, a feature having a frequency below an upper threshold and above a lower threshold may be given a relatively large weight as those features may be informative and less prone to noise of high and low frequency features.

For example, when the strings of the collection include documents (e.g., news articles, scholarly papers, or other plain language documents), a trigram feature "the" may have a very high frequency in the strings. That is, the term "the" may appear very often in the documents. However, the appearance of the term "the" may be very uninformative regarding the similarity of a string containing the feature "the" and an input string containing the feature "the" due to the high frequency in the documents to be searched. On the other hand, a feature "<B>z<E>" may have a very low frequency in the documents. However, the existence of the feature "<B>z<E>" in the documents may be subject to noise such that the appearance of the feature in the documents may also be uninformative as to the similarity of an input string containing the feature "<B>z<E>" and a string in the collection to be searched containing the feature "<B>z<E>". Thus, both features "the" and "<B>z<E>" may be given relatively low weights in the string analysis performed by the tool.

Embodiments further calculate an index containing each feature of a string or collection of strings. For example, an inverted index relating features to the plurality of strings in the collection to be searched may be created such that a mapping from each feature to every string in the collection that contains that feature is established. In this regard, the index may provide information regarding the relationship between a feature and one or more strings containing that feature (e.g., include a mapping between features and every string in a plurality of strings in the collection to be searched that includes a given feature).

In addition, the index may be used to generate information regarding the features contained in the index (e.g., including self-information weights for the features). For instance, the feature index may be used to select candidate features for consideration in a similarity metric calculation from the features found in an input string. This ensures that only strings from the collection that have a positive similarity score are considered. That is, only strings in the collection to be searched with a feature common with the input string are considered. The distribution of features in the index tends to be Zipfian (e.g., there may be relatively few high frequency features and relatively many low-frequency features).

As disclosed, each feature in the index may have a self-information weight calculated for the given feature. This self-information weight may be calculated based on the probability of a feature appearing in a string in the collection to be searched. In this regard, features in the index may be sorted based on frequency of appearance in the strings to be searched and/or the value of the self-information weights for the respective features.

For instance, there are typically a relatively small number of features that are found in large numbers of strings in the collection and produce large numbers of low scoring string candidates. String candidates selected by high-frequency features that in fact have high similarity scores usually share low frequency features with the input string and thus can be collected by means of those low frequency features. Additional approaches to optimize candidate selection without compromising the search results that would be obtained by a brute force approach are disclosed in greater detail below.

Embodiments further calculate a similarity metric that describes the similarity between an input string and one or more strings from a collection of strings. As disclosed, the similarity metric may be an intuitive similarity score between an input string and a string from the collection of strings to be searched that ranges between 0% (or 0) and 100% (or 1). In this regard, a perfect overlap of the input string and a string from the collection may result in a similarity metric of 100% or 1, whereas no overlap between the input string and the string of the collection may result in a similarity metric of 0% or 0. Calculating the similarity metric for a given input string and a string from the collection may include calculating a similarity metric based on commonality of features between the input string and the string from the collection using the feature representation for each string pair that is to be compared. The similarity score may be computed by observing features that are shared between the input string and strings in the collection and/or by observing features that are present in the input or strings of the collection, but that are not shared. The commonality and dissimilarity of strings may have relative weights in calculating the similarity metric.

Embodiments may utilize any one or more of known similarity metrics. Examples include weighted average as a ratio of feature weights in common over all features, the Jaccard similarity index, a Bayesian approach that computes the probability of having features in common, etc. Further examples of potential similarity metrics that may be employed are disclosed in, for example, Dekang Lin, "An Information-Theoretic Definition of Similarity," *ICML '98 Proceedings of the Fifteenth International Conference on Machine Learning*, Morgan Kaufmann Publishers Inc., San Francisco, 296-304 (1998).

Optimizations

Embodiments can perform a number of optimizations relative to the features of the input string and/or strings of the collection undergoing analysis. The optimizations may reduce the computational resources required to compute similarity metrics between an input string and a plurality of strings in a collection of strings. For example, a brute force approach to string searching a collection of strings is to loop over every string in the collection of strings and calculate a similarity metric for each string in the collection. Calculating the similarity metric may be relatively fast when carefully optimized by precomputing the self-information weights for each feature in the index as described above, sorting the features in the index, and computing the self-information weight of the input string features only once. However, this approach is still wasteful because strings that do not have any features in common will be compared to each other. Thus, in one embodiment, only strings with a feature in common with an input string to calculate the similarity metric are used.

Further, embodiments may provide a more efficient process for determining similarity metrics by reducing the number of similarity metrics that must be calculated for any given analysis between an input string and a plurality of strings in a collection to be searched. In this regard, embodiments filter input features used in generating a similarity metric, prune features from the index, and/or use a guaranteed rank threshold algorithm. Any or all of these approaches may reduce the processing overhead expended and improve the functioning of the computer used to generate similarity metrics between an input string and a collection of strings to be searched.

For example, once an input string is received, a first optimization may be a candidate filtering approach that allows eliminating consideration of input features from the index used to calculate the similarity metric. For example, as described above, in the context of textual string searching, the distribution of the features in the strings tends to be Zipfian. In turn, high frequency features may have low self-information weights that may not contribute significantly to the similarity metric in view of the high frequency of the features. In turn, establishing a minimum similarity metric may allow for determining features in the input string that may be ignored given the features are incapable of contributing to a similarity metric above the minimum similarity metric.

Embodiments may utilize the known frequency distribution or self-information weight obtained from the index such that string candidate look up for high frequency features may be eliminated by establishing the minimum similarity metric threshold. In turn, the number of features from the input string that must be queried in order to guarantee that there will be no strings from the collection missed that have a similarity metric above the minimum similarity metric threshold may be calculated. Accordingly, once this calculated, value related to the number of features needed to be queried to only return strings from the collection having a similarity metric above the minimum similarity metric threshold is known, it may be used to eliminate the most frequent features of the input string from consideration such that the number of string candidates from the collection of strings may be greatly reduced. That is, given a reduction in the number of input features, a decrease in the number of strings from the collection that may be returned having at least one feature matching the input feature may also occur.

One embodiment reduces the number of input features by starting with a similarity metric defined as:

$$sim(r, s) = \frac{2I(r \cap s)}{I(r) + I(s)} \quad \text{Equation 1}$$

where r represents an input string and s represents a string from the collection. As such, $I(r \cap s)$ is a function that returns the sum of the self-information weights of the features common to r and s. The functions $I(r)$ and $I(s)$ represent the self-information weights of the features of the input string r and string from the collection s, respectively. As such, in Equation 1, the values for the self-information for features in r may be expressed as $I(r)$ and the self-information weight of features in s may be expressed as $I(s)$, which are calculated as:

$$I(r) = I(F(r)) = \sum_{f \in F(r)} -\log P(f) \quad \text{Equation 2}$$

$$I(s) = I(F(s)) = \sum_{f \in F(s)} -\log P(f) \quad \text{Equation 3}$$

where $F(r)$ and $F(s)$ represent some function for converting an input string r or a string from a collection s into a set of features. In addition, $P(f)$ is the probability of a feature which can be calculated by dividing the number of times a feature appears in the strings of the collection by the total number of instances of all features.

Equation 1 above may be rewritten to include weighting parameters relative to the input features or collection features as mentioned above. Therefore, Equation 4 may be derived as follows:

$$sim(r, s) = \frac{I(r \cap s)}{w * I(r) + (1 - w) * I(s)} \quad \text{Equation 4}$$

where w is an input weight parameter. In Equation 4, the input weight parameter is utilized relative to the self-information weights of the input string and strings from the collection so that the values behave as a weighted average such that the input weight parameter and the collection string weight sum to 1.

In turn, an optimization technique described above where input features are removed from consideration (i.e., candidate filtering) may be employed with respect to Equation 4. As an initial step, Equation 4 may be rewritten as an inequality that defines the minimum score threshold that defines which features in the input string can be disregarded. Note that a string from the collection maximally contributes to the similarity metric when every feature in the strings from the collection is also found in the input string. When this condition is met, the numerator in Equation 4 is equal to $I(s)$ such that:

$$\tau \leq \frac{I(s)}{w * I(r) + (1 - w) * I(s)} \quad \text{Equation 5}$$

In this regard, rather than calculating Equation 4 for each input string/collection string pair, Equation 5 may be used to determine which input features may be eliminated based on a minimum similarity metric threshold T. It may be known that the term $I(r)$ will not change for each input string/collection string pair because $I(r)$ is dependent only on the input string. While the value of $I(s)$ cannot be calculated because it may be different for every input string/collection string pair, Equation 5 may be solved for $I(s)$ to render:

$$I(s) \geq \frac{\tau * w * I(r)}{1 - \tau(1 - w)} \quad \text{Equation 6}$$

Equation 6 represents that I(s) must be greater than a term containing the minimum score τ, input weight w, and I(r) in order for s to have any possibility of having a similarly score with r that is higher than T. Accordingly, when the input features are used to select candidate features from the collection of strings, the candidate features must satisfy Equation 6 in order to be considered.

In turn, one potential strategy is to sort the features in the index in order of descending frequency in the collection of strings. A sum of the information of the features in order may be calculated such that the sum satisfies Equation 6. The remaining (and more informative) features are then used to gather candidate strings from the collection of strings such that a similarity metric is only calculated between the input string and each of these candidate strings determined from the index that share a feature.

One example of the foregoing optimization technique may be applied for a collection of strings that have the following features whose respective information calculations are:

| Feature | P(F) | I(F) |
|---------|---------|-------|
| F1 | 0.00001 | 16.61 |
| F2 | 0.0001 | 13.29 |
| F3 | 0.001 | 9.97 |
| F4 | 0.01 | 6.64 |
| F5 | 0.1 | 3.32 |

Now, assume an input string (r) has the following features F(r)={F1, F3, and F5} and one of the strings of the collection (s1) has the following features F(s1)={F5}. The similarity of r and s1 is (assuming w=0.5):

$$sim(r, s_1) = \frac{3.32}{0.5*29.9 + 0.5*3.32} = 0.20$$

Assume another string of the collection ($s_2$) that has the following features F($s_2$)={F1, F3, F4}. The similarity of r and $s_2$ is:

$$sim(r, s_2) = \frac{26.58}{0.5*29.9 + 0.5*33.22} = 0.84$$

Given the high probability of the similarity between r and every string in the collection that contains F5 (e.g., as much as 10% of the corpus if F5 never occurs twice in the same string) may be required to be calculated. This represents a very high utilization of computational resources that may return only very small, uninformative similarity metrics. In contrast, F5 and F3 may require calculating the similarity on 0.1% and 0.001% of the collection, respectively. Thus, using F5 to gather up candidates is both expensive and generally pointless (contrast the 20% similarity with the 84% similarity). So, a minimum score threshold of x=0.5 may be established to remove from consideration the feature F5.

One embodiment uses an optimization technique that establishes a minimum similarity metric threshold as a parameter used to remove feature-to-string mappings from the index after the index has been created (i.e., feature index pruning). For example, the number of features that must be mapped in order to guarantee that there will be no string candidates from the collection missed for a given minimum similarity metric threshold may be established. Once the calculated value associated with the minimum similarity metric threshold is known, it may be used to remove feature-to-string mappings from the index.

As disclosed, the strings from the collection may be represented in an index containing mappings between features and strings and may be examined to determine which features are not to be mapped in the index for a given minimum score threshold and input string weight. In this regard, feature-to-string mappings may be removed from the index such that corresponding strings from the collection having only features that have been removed from the index may not be returned as candidate strings for which a similarity metric is calculated. In this approach, it is noted that r maximally contributes to the similarity metric when every feature in r is also found in s. When this condition is met, the numerator in Equation 4 may be set to I(r) and may be used to establish the inequality:

$$\tau \leq \frac{I(r)}{w*I(r) + (1-w)*I(s)} \qquad \text{Equation 7}$$

Now Equation 7 may be solved for I(r) which results in:

$$I(r) \geq \frac{\tau*(1-w)*I(s)}{1-\tau*w} \qquad \text{Equation 8}$$

Equation 8 may now be used for determining a minimum required value of I(r) such that τ has any chance of being greater than the provided minimum similarity metric threshold. Given the calculated minimum value of I(r), features of the strings of the collection (s) that can be eliminated from the index can be identified. One embodiment sorts the features of s in order of descending frequency. The information of the features in that order may be summed such that the sum does not exceed the value of I(r) that was calculated. Accordingly, the remaining (and more informative) features are left in the index for consideration in the calculation of similarity metrics between an identified input string and the strings of the collection based on the pruned index where features have been removed. To generalize the operation of this optimization, the smaller the value of w (the weight parameter for the input string) the more features can be removed the index. Similarly, the larger the value of τ, the more features can be pruned from the index.

The above disclosed optimizations all include subjectively determined parameters utilized to reduce the computational overhead required to perform string matching to produce search results. In this regard, for approaches that require string matching, application developers are generally needed to determine the appropriate parameters to achieve a desired balance between speed of computation of the string similarity metrics and the number of features and strings analyzed. For example, with an increase in the required minimum similarly metric, the search speed is improved as additional candidates may be filtered or more features may be pruned from the index. However, setting a minimum similarity metric is a poor proxy for what is often desired: to get back a given number of "top" results (i.e., the results from a collection of strings that most closely match the input string as reflected in the similarity metric for the strings in the collection). By increasing the minimum similarity metric, the probability of returning to the user the desired number of top results goes down because there may not be a sufficient number of results that exceed the minimum similarity metric established.

In contrast, a further approach to string analysis in embodiments exploits both a minimum similarity metric and a maximum results parameter to reduce the tension between an overly constrictive minimum similarity metric and providing meaningful results. In addition, embodiments described below also significantly improves performance in most cases. For a given input string, a minimum similarity metric, and a maximum number of results, a string similarity search is performed according to the following.

Initially, the input features of the input string are sorted by increasing frequency and candidate strings from the collection of strings to be searched are gathered for each input feature in turn and scored according to Equation 4 disclosed above. The candidate strings that contain the selected input feature are retrieved using the index and a similarity metric is calculated for the candidate strings containing the input feature. The candidate strings are ranked from the largest similarity metric to the smallest similarity metric. For each input feature, a guaranteed rank threshold ("GRT") is calculated. The calculation of the GRT may be iterative such that at each iteration an additional feature from the sorted input feature list is added for consideration of the GRT. The GRT may be calculated as:

$$GRT \leq \frac{I(r) - \sum_{n=1}^{i} I(f_n)}{w*I(r) + (1-w)*\left(I(r) - \sum_{n=1}^{i} I(f_n)\right)}.$$

Equation 9

As disclosed, Equation 9 is similar to Equation 5 described above used for candidate filtering. However, rather than providing a condition in which the numerator is equal to I(s) to establish the minimum similarity metric when s maximally contributes to the similarity metric when every feature of s is also found in r, Equation 9 utilizes a term that represents the optimal value of I(s) for a candidate string that does not have any of the input features that have yet to be iterated over. That is, the optimal value for such a string candidate is I(r) reduced by the sum of the self-information weights of all of the features of the ranked listing of input features that have been considered in previous iterations.

With Equation 9, the input weight w may be adjusted for various applications. For example, in the context of a search tool that employs search-as-you-type functionality, the input weight w may be set relatively high (i.e., near 1). This reflects a desire to reduce the penalty imposed on strings in the strings to be searched that include features not present in the input string. This is important especially in the context of a search-as-you-type approach as the input string may be searched even when incomplete (i.e., in a preliminary state prior to the user completing the desired search query). In such contexts, the fact that a string in the collection to be searched shares features with the input string is more informative than the fact that a string in the collection to be searched includes features other than those features in the input string. In this regard, the input weight w may be greater than the weight applied to features from the strings in the collection. That is, in the context of Equation 9, w may be greater than 0.5. Moreover, the input weight w may be at least twice the weight applied to features from strings in the collection (i.e., w may be 0.66 or greater). In yet other applications, the input weight may be at least about 0.9.

As disclosed, the similarity metric used for string searching may advantageously allow for efficient re-ranking of the results relative to an alternative ranking structure applied to the search results. The similarity metric derived for strings using Equation 6 may provide a globally adaptable score between 0 (for no similarity) and 1 (complete similarity). In turn, rather than an arbitrary metric, the result of the calculation of the similarity metric according to Equation 6 provides a relative metric for all strings between 0 and 1. This may be particularly useful in the context of re-ranking results. For example, the results from a search of a collection of strings may be initially ranked based on similarity to an input string as described above. These results may have various similarity metrics ranging from 0 to 1 such that the returned strings may be ranked according to the similarity metric.

In addition, alternative rankings may also be provided for the collection of strings that may be used to re-rank the results. For example, alternative rankings may include relative popularity of web sites searched, population rankings for geographic locations searched, distances to relative geographic locations, relative popularity of products, or any other quantifiable ranking of the collection of strings to be searched. In this example, the alternative rankings may also be scaled to ranked values between 0 and 1, where strings near 1 represent higher ranked strings and strings near 0 represents the lowest ranked string. As such, the returned ranked results may be re-ranked using these alternative rankings. For example, the similarity metric for a string may be averaged with the ranking value for the string in the alternative rankings to achieve the re-ranking. Alternatively, the relative ranking values may be weighted such that, for example, the similarity metric is more highly weighted than the alternative ranking or vice versa.

As each iteration of calculating the GRT is determined, the value of GRT is reduced at each iteration. This may be appreciated in the fact that the numerator reflects the difference between the self-information weight of the input string and the sum of the self-information weights of all the features that have been used in the iteration, while the denominator includes a weighted sum of these values. As such, the denominator increases with each subsequent iteration such that the value of GRT is reduced.

Figure 2:
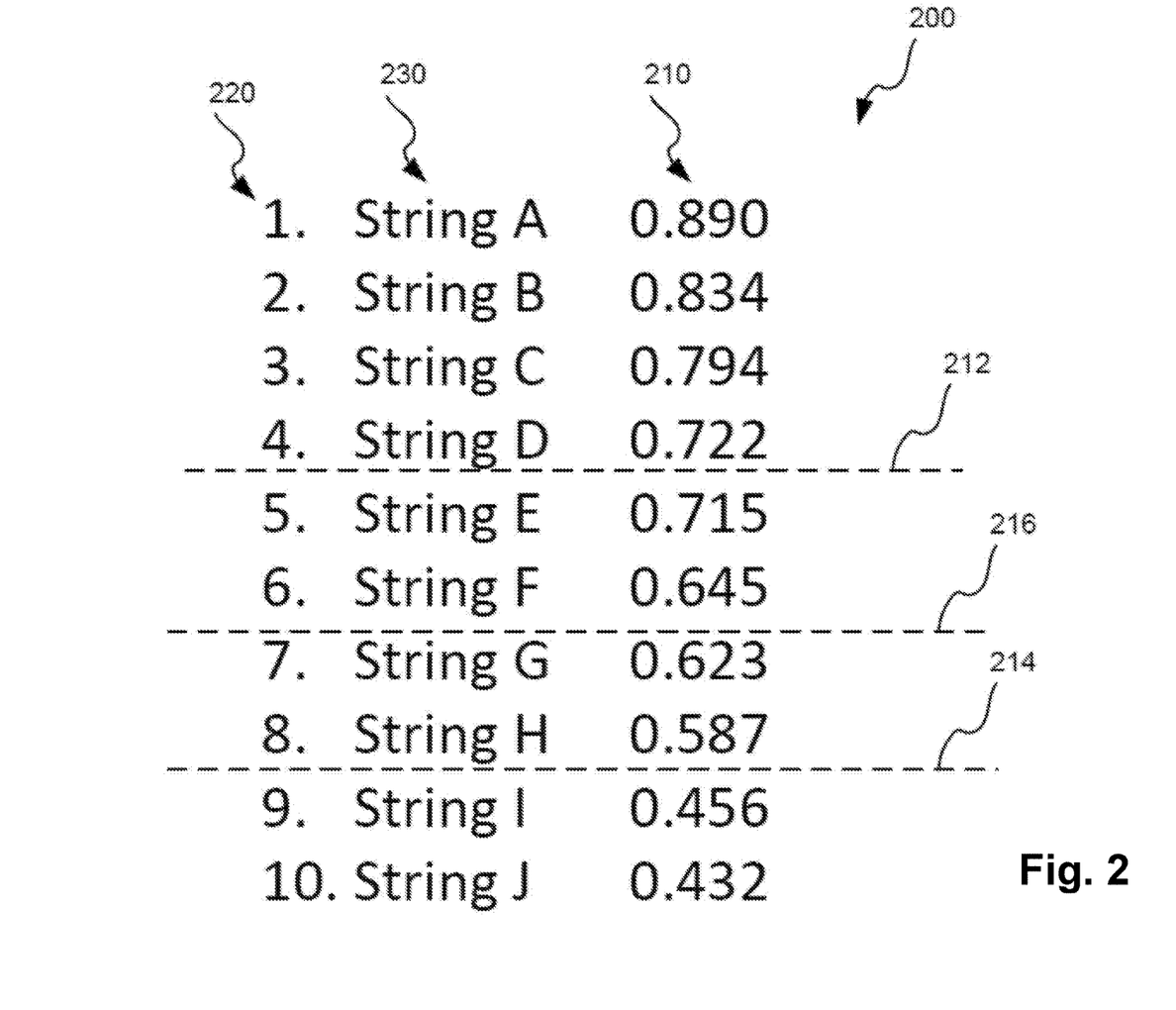
FIG. 2 illustrates a graphical representation of an iterative process in accordance with one embodiment.

FIG. 2 illustrates a graphical representation of the iterative process in accordance with one embodiment. In FIG. 2, an ordered list 200 of ten strings from a collection to be searched containing the input feature used to generate a GRT in a first iteration are provided. In this case, ten strings are shown, but it may be appreciated that more or fewer strings may be retrieved based on the input feature. Each retrieved string containing the input feature considered are provided in the ordered list 200. In FIG. 2, the similarity metric 210 for each string is shown along with a rank 220 and a string descriptor 230.

In the example depicted in FIG. 2, a first iteration GRT of 0.718 may be obtained using Equation 9. This first iteration GRT 212 is represented in FIG. 2 as a dotted line relative to the list 200. In this regard, String A, String B, String C, and String D each have a similarity metric 210 that exceeds the first iteration GRT 212. Therefore, these four strings can be added to a guaranteed portion of strings and the designated rank 220 of these strings is guaranteed to be final in the search results. The strings falling below the GRT may be added to a potential portion of strings whose inclusion and rank are conditional on further iterations.

In addition, a minimum similarity metric 214 of 0.5 may be established in the example depicted. The minimum similarity metric 214 is represented as a dotted line relative to the list 200. Accordingly, String I and String J fall below the minimum similarity metric 214 and therefore will not be returned in the search results.

A second iteration that includes consideration of the next less frequent feature of the input string is performed. In this regard, the process of the first iteration may be repeated where strings from the collection containing the next input feature are retrieved, a similarity metric 210 is calculated, and the results are ranked. At this point, the similarity for all the strings with the first input feature have already been determined and the similarity needs to only be calculated for strings that have not been looked at yet. While a static listing of strings is depicted in FIG. 2, additional strings may be provided in the list 200 in subsequent iterations as new input features are considered and additional candidate strings are retrieved that contain the new input features considered.

In any regard, a second iteration GRT 216 may be calculated during the second iteration. This second iteration GRT 216 is represented as a dotted line relative to the string instance 200. For instance, the second iteration GRT 216 may be calculated as 0.625. In this regard, String E and String F now exceed the second iteration GRT 216 and are therefore added to the guaranteed portion of the search results such that the rank 220 is guaranteed in the final results.

In turn, the iterations may continue by adding the next least frequent feature from the input string into each iteration. The GRT will be reduced at each iteration. As such, the iteration may continue until the GRT calculated for an iteration falls below the minimum similarity metric 214. For instance, if the GRT for an iteration falls below 0.5 in the example shown in FIG. 2, the iteration may terminate and strings exceeding the minimum value may be returned in the guaranteed rank in the results to be presented to the user.

Alternatively, the iterations may continue over each of the input features from the input string until a maximum number of search results are provided in the guaranteed portion of strings or the set of input features are exhausted. For instance, if the maximum number of search results is 10, the iterations may continue until 10 results are provided in the guaranteed portion of strings whose rank is guaranteed by exceeding the GRT. The example provided of 10 results is merely illustrative, and the actual maximum number of search results may be a parameter that is provided by a search tool designer that may vary over any integer value without limitation.

Alternatively, once the input features are exhausted, there may be strings in the potential portion that fall below the GRT, but above the minimum similarity score. For instance, if the iteration were to terminate after the second iteration shown in FIG. 2 as having iterated over all input features, String G and String H would still fall below the second iteration GRT 216 and above the minimum similarity score 214. As such, the strings in this potential portion of strings would be returned in the rank provided after completing the iteration as results.

Accordingly, for each iteration, ranked candidate strings from the collection whose similarity metric is above the GRT are added to a group of guaranteed search results. The rank of these results is guaranteed to be provided in the final results. The rank of these candidates is guaranteed to be final because it is not possible for a candidate string that does not have one of the features from the ranked features visited in previous iterations to have a similarity score higher than the GRT. That is, as each subsequent candidate feature is added to the summation of Equation 9, the GRT will get smaller, so that any further candidate strings added by virtue of a further iteration will have a lower similarity score than the subset of guaranteed candidate strings from a prior iteration. The final rank of candidates whose similarity score falls below the GRT, but above the minimum similarity metric is unknown and such candidates can only be added to the final ranked results in a subsequent iteration where the GRT gets smaller or if all features have been iterated and the maximum number of results have not been reached by guaranteed results.

Reduced Memory String Feature Index

As disclosed above, embodiments calculate an index containing each feature of a string or collection of strings. In particular, for embodiments that utilize GRT for optimization and string similarity analysis, the index can become very large and consume a large amount of memory as the GRT scales to tens of millions of strings and provides robust and near-instantaneous results in the face of misspellings, differing word order, and incomplete information. Therefore, in one embodiment, the generated index is then used to build a low memory read-only copy of itself. This is accomplished by employing specialized data structures backed by byte arrays that store byte-encoded objects required by the index. By storing the data in a few byte arrays, the memory overhead of storing potentially millions of objects is eliminated and the resulting indexes require dramatically less memory while still remaining very fast.

In one embodiment, the generated index stores and indexes any arbitrary object (e.g., a feature representing a string, the actual string itself, etc.) via generic parameter typing. This allows a user of the index to define their own object type and add objects of that type to the index. An object is added to the index via a posting which is defined as a pairing of an object and a string that is used to index the object. As a data structure, a posting is an identifier and a sequence of the feature IDs derived from the posting string (disclosed in detail below) and is mapped to the object that it was posted with.

There is a many-to-one relationship between postings and objects which allows for alternate strings to be used for finding those objects. For example, different attributes, alternate names, or alternate spellings can be used when posting an object. In one embodiment, the objects added to an index are the strings they are posted with (i.e., the posted object added and the posting string are one and the same). In an example of a more complicated use case, an object representing a person record might have a name and an address. One posting for such a person object could correspond to the name of the person and another corresponding to the address. In this way, the string similarity search could find person objects using either names or addresses.

In one embodiment, each string that is used to index an object when it is posted is transformed into a set of features (e.g., character n-grams). A feature index keeps track of, for each feature, a feature string, an identifier for the feature, and a frequency count corresponding to how many times a feature has been seen over the collection of strings posted to the index. The feature index provides feature weights using the feature counts which are in turn used for the similarity metric calculation.

Embodiments include a main index that includes the feature index, a collection that maps all feature IDs to the postings they are found in, and a collection that maps posting identifiers to the objects they index. Each posting also has a weight that is computed when the index is built corresponding to the sum of the weights of its features. A feature ID in embodiments is an integer value that identifies a feature. The features derived from a string added to the index are stored as IDs rather than the features themselves to save space. A posting is a string/object pair in which the string is used to index the target object. These pairs are also given IDs (i.e., "posting IDs").

This allows for the retrieval of all of the postings, when matching, for a given feature ID and then for each posting the identifying of the object it is associated with. Which feature IDs should be used to retrieve candidate postings to evaluate for match results can then be optimized using the above-disclosed GRT algorithm, for example.

In one embodiment, the index is transformed into a read-only, low-memory version using byte encoding. Byte encoding in general is directed to the processing of mapping characters in a string to one or more bytes. However, in embodiments, byte encoding is used for the mapping of any arbitrary object in memory to a sequence of one or more bytes. Embodiments emphasize the sequence of contiguous bytes to store the contents of one object. Therefore, in embodiments, the byte encoding is similar to object serialization except that one emphasis is on being as memory efficient as possible.

There are a variety of known techniques for byte encoding. One common technique is "variable length byte encoding" and is frequently used for byte encoding integer values. Here the first seven bits of a byte are used to encode a value and the last bit is used as a continuation flag. If an integer value cannot be represented in seven bits (i.e., a value from 0 to 128), then more than one byte is required and a continuation flag is used to indicate that the next byte is also used to store the value. One specialization of variable length encoding is UTF-8 character encoding which can be used to byte encode strings.

Known techniques, such as disclosed above, can be used to byte encode a wide variety of types of objects. In general, a byte-encoded representation of an object is much smaller than the original object. For example, an integer value such as "5" can be represented by a single byte whereas integer values are generally stored by default as a four-byte primitive. Further, objects have overhead associated with them that can be eliminated by writing many byte-encoded objects to a single large byte array.

Embodiments generate a substantially memory efficient way to encode an array of sorted integers. With embodiments, sorted integers appear in the index in two places. The first is in the postings which each contains a sorted list of feature IDs. The second is the map from each feature ID to the postings where they are found is stored as a sorted list of posting IDs. Embodiments perform byte encoding for encoding sorted integers as follows: Instead of encoding each integer using variable length encoding (as disclosed above), only the first integer is encoded as normal. All subsequent values are encoded as the difference between the current value and the preceding value. With the exception of one trivial case, these differences are guaranteed to be smaller than the actual integer values. Because the differences are smaller values, they will, on average, require fewer bytes to encode them, especially in aggregate over millions of integers.

Embodiments utilize two general-purpose low-memory data structures to store the encoded array. The first is referred to as a "tightly-packed list" and is, in general, a standard list or an array of objects that allows retrieval of those objects by its ordinal position in the collection. That is, the first object can be retrieved with the value 0, the second object can be retrieved with the value 1, and so on. It is referred to as tightly-packed because instead of storing each object as a computer language would normally store them, it instead byte encodes each object and stores those bytes in a single underlying byte array.

For each object, the object is byte encoded, and the number of encoded bytes is noted. The number of encoded bytes is also byte encoded and those bytes are prepended to the object's bytes and together are written to the backing byte array. The offset where those bytes were written to is recorded in a separate lookup table of offsets. An object is retrieved from the tightly packed list by ordinal position by looking up the byte array offset for that ordinal in the table of offsets and decoding an integer value from the byte array at that offset. This number is equivalent to the number of bytes used by the object encoded immediately after the integer value. That number of bytes is read from the byte array and decoded back into the original object and returned. This saves memory over a conventional list data structure because there is no overhead associated with each object and because the byte-encoded objects themselves are smaller. For example, in Java, the Java virtual machine ("JVM") allocates 24 bytes per object. This adds up to a large amount of memory consumption if there are millions of small objects as is the case with the GRT index.

The second data structure generated by embodiments is referred to as a "tightly-packed map" and is, in general, a standard map data structure that maps an identifier to an object. The integer used to lookup an object is not an ordinal position but rather an arbitrary identifier than uniquely maps to an object. This data structure is very similar to the tightly-packed list because when an object is written it is byte encoded and written to an underlying byte array along with the byte encoded number of bytes and the offset where it was written to is also recorded in an offsets table. However, the data structure is augmented with a sorted array of identifiers. To retrieve an object corresponding to a provided identifier from a tightly-packed map, a binary search is performed on the sorted array of identifiers. This determines the ordinal position of the identifier which is used to look up the offset in the offsets table which is then used to pull bytes off the byte array and decode the object as before.

Based on the above data structures, embodiments generate a low-memory feature index as follows: Each feature is hashed to an integer value using a standard hashing technique and a tightly-packed map is employed to store a hashed value to feature ID mapping. Because feature IDs are assigned during the index construction, they can be used as ordinal position values for an array of counts. Therefore, to get the count of a string feature, the feature is hashed, the feature ID is retrieved from the tightly-packed map, and the count is looked up in the array of counts as the ordinal position given as the feature ID.

This low-memory version of the feature index is more than 10 times smaller as tested than its full-memory counterpart. It is also may be slower, but this generally does not cause problems because the feature index is used very little at match time since it is only used to assign feature weights to the features of the input string. The feature weights of the match candidates are precomputed in the default full-memory index and stored when the low-memory index is built as disclosed below A low-memory index is constructed from a low-memory feature index and the following data structures. A tightly-packed list is used to map feature IDs to the posting IDs they are found in. The posting IDs are represented as an array of sorted integers and are byte encoded as described above for byte encoding sorted integer values. The postings are retrieved by feature ID by treating the feature ID as an ordinal position in the tightly-packed list.

A second tightly-packed list is used to store the feature IDs of each posting. The feature IDs for each posting are byte encoded using the technique described above for byte encoding sorted integer values. The feature IDs for a posting are retrieved by a posting ID by treating the posting ID as an ordinal position in the tightly-packed list. The weights of the postings are pre-computed and stored in a simple array of floating point values and are retrieved from the array using the posting ID as an ordinal position.

Finally, a third tightly-packed list is used to store the posted objects. Each posting is byte encoded using a byte encoding defined for the object type of the postings. In various embodiments, several types of byte encodings can be used. In view of arbitrary object definitions, a user can define their own byte encodings for the type of objects they are posting. Posted objects are retrieved using a provided posting Id and treating the posting ID as an ordinal position in the tightly-packed list.

Figure 3:
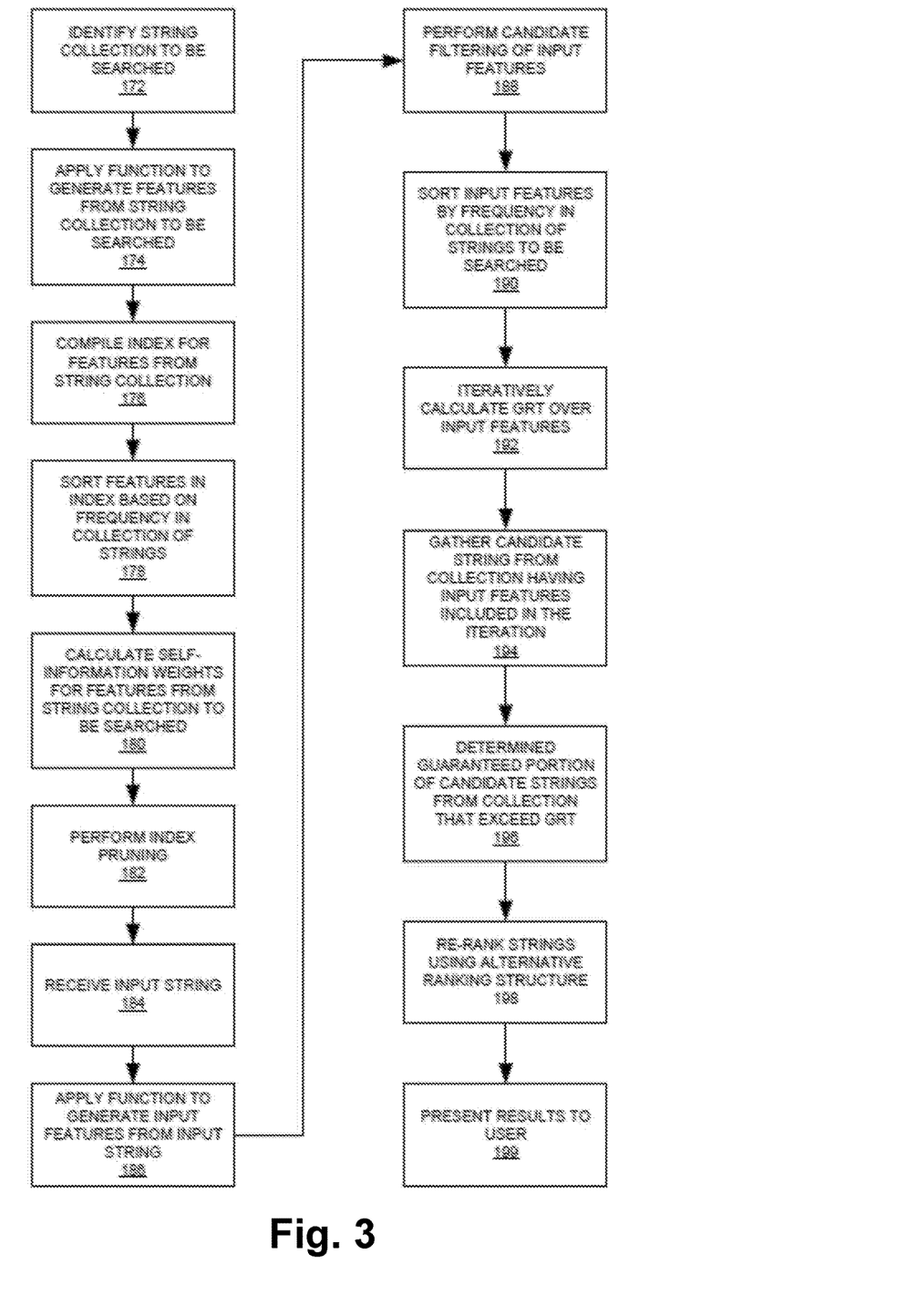
FIG. 3 is a flow diagram of the high level functionality of the string similarity search module of FIG. 1 when providing string similarity search in accordance with one embodiment.

FIG. 3 is a flow diagram of the high level functionality of string similarity search module 16 of FIG. 1 when providing string similarity search in accordance with one embodiment. In one embodiment, the functionality of the flow diagram of FIG. 3 (and FIGS. 4 and 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 172, the strings from a collection that is to be searched are identified. The strings in the collection may correspond to textual data any other type of data representable in the form of strings.

At 174, a function to generate features from the strings in the collection of strings to be searched is applied. For example, one function that may be applied to the strings from the collection can be the generation of n-grams.

At 176 an index for features that have been generated from the collection of strings to be searched is compiled. The index may include feature-to-string mappings such that each string in the collection of strings to be searched that includes a feature may include a corresponding mapping to the indexed feature. Further, embodiments generate a low-memory feature index as disclosed above and as further disclosed in conjunction with FIG. 4.

At 178 the indexed features are sorted based on the frequency of the indexed feature in the collection strings to be searched. For example, the index may be sorted in ascending order of frequency relative to the features.

At 180, the frequency can be used to calculate self-information weights for the features in the index.

Embodiments can include a number of optimization techniques that may help to improve the performance of the string searching. For example, at 182 index pruning may be performed in which high-frequency features in the index may be removed based on the fact that the high-frequency features may not be operative to contribute to a similarity metric above a prespecified global minimum similarity threshold.

At 184 an input string to be searched is received. For example, the input string may correspond to all or a portion of a search query received from a user in connection with a search tool. In a search-as-you-type context, the input string may refer to a completed search query entered by the user or may correspond to the portion of the search query entered by the user. Therefore, the string similarity searching may be performed in the search-as-you-type context even prior to receiving the full search query from the user.

At 186, a function to generate input features from the input string is applied. The function applied to the input string at 186 may be the same as the function applied to the strings from the collection to be searched at 174 so that the form of the input features match the form of the features contained in the index.

At 188, another optimization that may be performed is candidate filtering of the input features. That is, input features having a high frequency in the index may be disregarded as the input features may not be operative to contribute to a similarity metric above a minimum similarity metric threshold.

At 190 the input features by frequency relative to the collection strings to be searched is sorted. That is, the input features may be sorted based on the frequency with which the respective features appear in the collection strings to be searched. This may be based on the compiled index for the features corresponding to the strings to be searched.

In embodiments, the functionality of 188 and 192 are optional and performed after the functionality of 190. Then, 188 is optionally performed when a minimum score is provided and no maximum results parameter is provided, or 192 is optionally performed (i.e., GRT) instead of 188, as well as 194, 196, 198, when a maximum results parameter is provided and, optionally, a minimum score is also provided.

At 192, embodiments iteratively calculate a guaranteed ring threshold ("GRT"). The iteration may begin using the least frequent input feature to generate the GRT.

At 194, candidate strings from the collection of strings to be searched that have features corresponding to the one or more input features included in the given iteration of the GRT calculation are gathered. Additional details of 194 are disclosed in conjunction with FIG. 5 below.

At 196, a guaranteed portion of these candidate strings from the collection of strings to be searched that exceed the GRT for the given iteration are determined. The candidate strings may be sorted based on a similarity metric generated relative to the candidate string and the input string. Therefore, candidate strings that have a similarity metric greater than the GRT for the given iteration may be added to the guaranteed portion of strings such that the rank associated with the sorting of the candidate strings in relation to similarity metric may be guaranteed for the candidates strings whose similarity metric exceeds the GRT for the given iteration.

After 196, functionality may continue at 192 to calculate a new GRT for the next iteration considering the next most frequent input feature that appears in the index, such as disclosed in conjunction with FIG. 2. This process of iteration may continue until a maximum number of results is achieved, the GRT falls below the minimum similarity threshold, or all input features have been used in the iteration.

Once the iteration completes, at 198 the strings to be returned to search results may be re-ranked based on an alternative ranking structure. The nature of the similarity metric utilized herein may provide a smooth range of similarity metric values from 0 to 1. In turn, alternative rankings (e.g., external metrics) for the strings in the collection to be searched (i.e., including independent rankings unrelated to any similarity to the input string) may be utilized to re-rank the results presented to a user. Examples of such re-ranking may include consideration of rankings or metrics of the strings in the collection to be searched. For example, in relation to geographic locations, population rankings, distance to the user location popularity of the strings in other searches, or other ranking information related to the strings may be utilized. This is commonly applied in connection to searching product listings in which the price, popularity, or other quantifiable metric related to the product may be used to re-rank searches in the context of a product search.

At 199, the search results may be presented to a user via a user interface. The presenting may include presenting a ranked list of strings from the collection to be searched that correspond to the input string provided by the user. Further, in a search-as-you-type context, the search functionality of FIG. 3 may be repeated with each new keystroke entered in relation to the input string such that the presentation 199 results to the user may occur at each successive keystroke.

Figure 4:
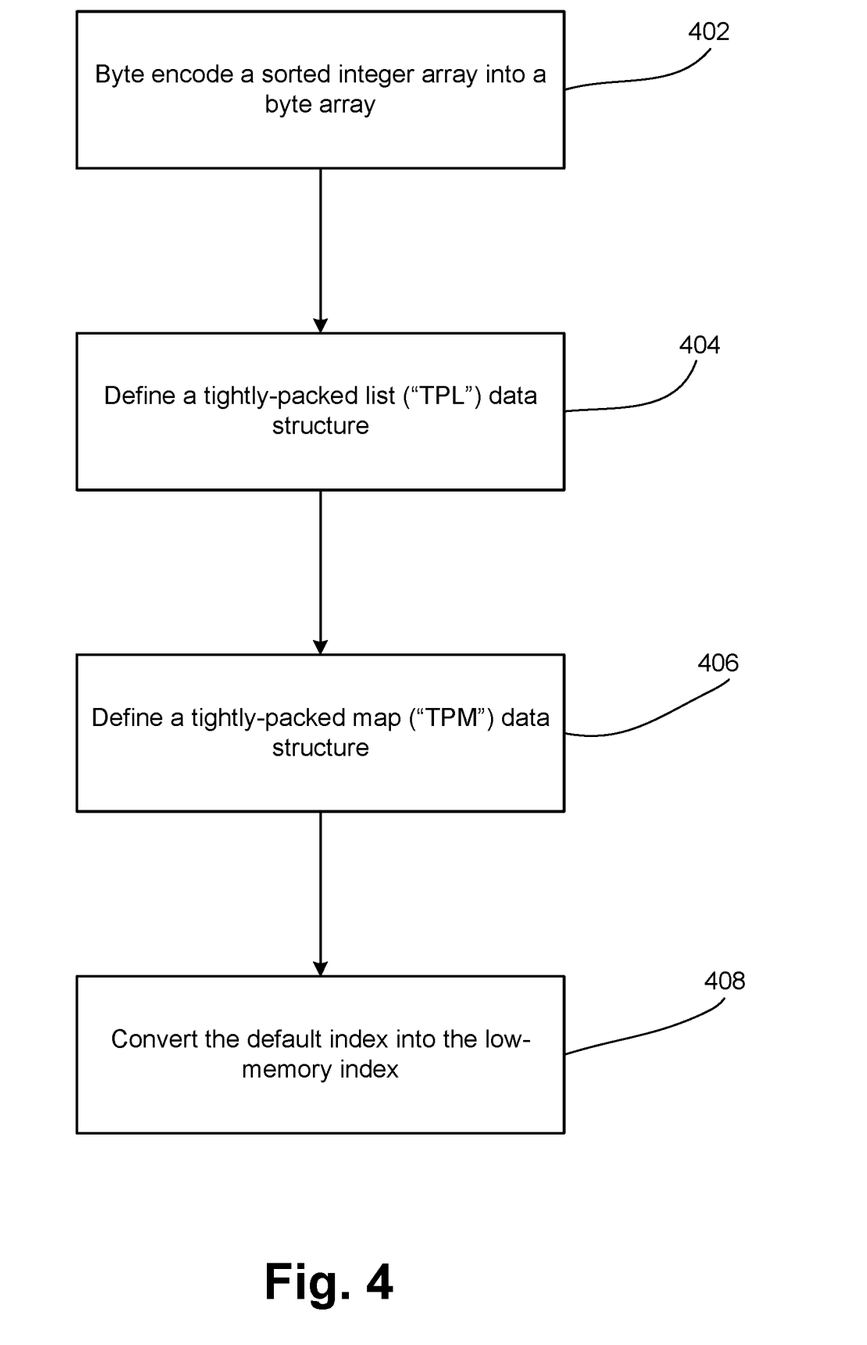
FIG. 4 is a flow diagram of the functionality of the string similarity search module of FIG. 1 when generating a low memory index for string similarity searching in accordance with one embodiment.

FIG. 4 is a flow diagram of the functionality of string similarity search module 16 of FIG. 1 when generating a low memory index for string similarity searching in accordance with one embodiment. The functionality of FIG. 4 is a more detailed and expanded description of the functionality of 176 of FIG. 3 in compiling an index.

At 402, embodiments byte encode a sorted integer array into a byte array. In one embodiment, the byte encoding includes a variable-length byte encoding for each integer value. In one embodiment, the byte encoding includes storing each value as the difference between the current value and the previous value.

At 404, a tightly-packed list ("TPL") data structure is defined. The TPL is a list data structure that allows elements to be retrieved by their ordinal position. In embodiments, the TPL has a single byte array that stores all of the byte-encoded elements stored in the list. The single byte array is a special purpose byte array that can handle a very large numbers of bytes. The TPL includes offsets that map the ordinal position to the byte offset position. The TPL includes an encoder/decoder that knows how to byte encode and decode the elements in the TPL. A retrieval of an element for a given position in a TPL includes getting the byte offset and reading from the byte array from that byte offset using the decoder to decode the returned element.

At 406, embodiments define a tightly-packed map ("TPM") data structure. The TPM is a map data structure that allows elements to be retrieved by an arbitrary key value. The TPM has all the data that a TPL has plus the keys sorted. The retrieval of an element for a given key involves performing binary search on the sorted keys to determine the values ordinal position. Once obtained, the value is retrieved in the same manner as in the TPL.

At 408, a default index (i.e., non-low-memory index) is converted into the low-memory index by storing the following data:

features-to-targets: a TPL of int[ ] that maps feature IDs (i.e., the feature IDs double as ordinal position values) to the posting IDs they are found in.

target-IDs-to-features: a TPL of int[ ] that maps a target ID to the feature IDs that are found in that target.

target-IDs-to-target-values: a TPL of target objects that maps a target ID to its corresponding object. Any object can be added to the index so long as there is an appropriate encoder/decoder that can handle the object type.

feature-index: a TPM of integer values that maps a hashed feature value to its corresponding feature ID. Features are derived from the indexed string and are typically character n-grams. For example, the word "Mondegreen" may have the features "Mon", "ond", "nde", and so on. Instead of mapping these feature values directly to their corresponding feature IDs, instead the feature values are hashed and the hashed values are mapped to the feature IDs.

Figure 5:
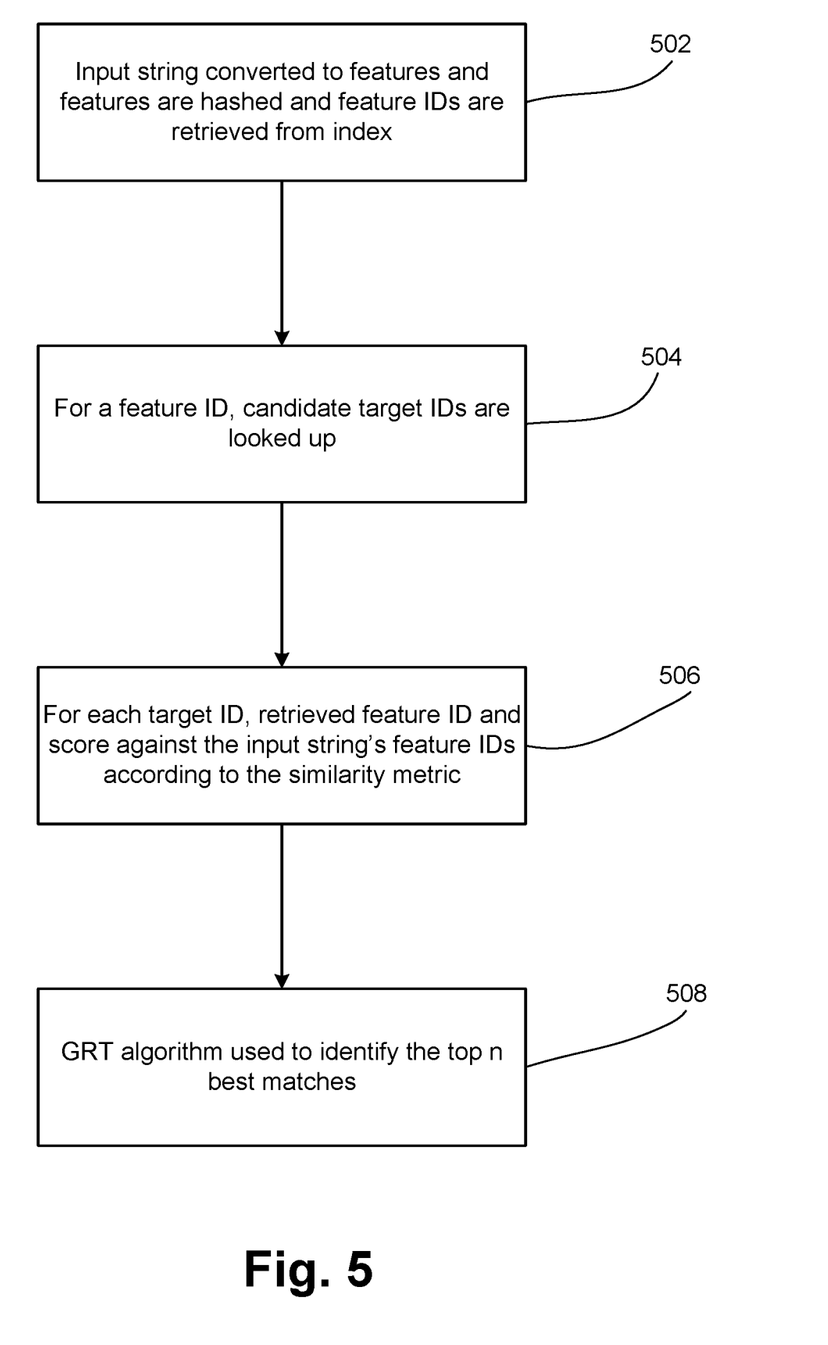
FIG. 5 is a flow diagram of the functionality of the string similarity search module of FIG. 1 for determining candidate strings to be search in accordance with one embodiment.

FIG. 5 is a flow diagram of the functionality of string similarity search module 16 of FIG. 1 for determining candidate strings to be search in accordance with one embodiment. The functionality of FIG. 5 is a more detailed and expanded description of the functionality of 194 of FIG. 3 which performs string matching using the GRT algorithm (i.e., Equation 9 disclosed above).

At 502, an input string is passed in and converted into features. The features are hashed and the feature IDs are retrieved from the 'feature-index' generated at 176 of FIG. 3 and in FIG. 4.

The GRT determines which feature IDs will be used to look up candidates and when the n-best matches can be returned as follows:

At 504, for a provided feature ID, candidate target IDs are looked up from features-to-targets index.

At 506, for each target ID, the feature IDs are retrieved from target-IDs-to-features index. Each candidate's feature IDs are scored against the input string's feature IDs according to the similarity metric.

At 510, the top n best matches are identified by the GRT algorithm. For each returned match, the target value is retrieved from target-IDs-to-target-values index. In this way, only returned values incur the expense of decoding the elements from target-IDs-to-target-values instead of doing this work for every candidate that was considered.

As disclosed, embodiments use novel index structures in order to reduce memory needs and improve computer functionality when performing string similarity analysis. In experimentation, memory analysis was performed on indexes built from three different data sets. For each, the default index (i.e., non-low-memory index) was built and the memory consumption was measured using "VisualVM." From each default index, a low-memory index was created in accordance to embodiments and compared with the default index. The results are shown in the table below. The first row, for example, shows that the default index for 263K city names was 114,991,273 bytes. In contrast, the low-memory counterpart was just 15,341,447 bytes and was 13.34% the size of the default index.

| Data | Default Index Size | Low Memory Index Size | % |
|---|---|---|---|
| 263,763 City Names | 114,991,273 | 15,341,447 | 13.34% |
| 3,602,558 Wikipedia Titles | 1,931,610,667 | 350,601,614 | 18.15% |
| 13,924,810 Yago Names | 7,298,281,029 | 1,266,175,690 | 17.35% |

Further, in embodiments, because most of the memory consumed using the disclosed low-memory indexes is in the form of large byte arrays, serialization and deserialization is extremely efficient. In experimental results, serialization was 66 to 204 times faster and deserialization was 31 to 120 times faster than serialization and deserialization on a default non-low-memory index. This is important in use cases in which indexes are marshalled across a distributed compute environment (i.e., their smaller size and fast deserialization makes it easier to move them across a distributed compute environment) or when a large number of indexes are available to an application and they are loaded on demand rather than trying to keep them all in memory.

Embodiments are disclosed in conjunction with string similarity analysis using GRT, which entails large in-memory data structures and index structures that can be represented as sorted integer arrays, and for which the memory to speed trade-off is acceptable. However, the disclosed low-memory index structures can also be implemented with string similarity analysis which uses optimization techniques other than GRT. Embodiments may provide advantages for any optimization technique that incorporates large in-memory data structures Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of string similarity search and analysis comprising:
   receiving a plurality of candidate strings of a collection to be searched;
   transforming each candidate string into one or more candidate features;
   generating a feature index that maps each of the candidate features to one or more candidate strings which include the candidate features;
   transforming the feature index into a low-memory index comprising:
      byte encoding a sorted integer array into an encoded byte array;
      hashing each candidate feature to an integer value and storing using a tightly-packed map a hashed value to feature identification (ID) mapping;
      using a first tightly-packed list to map each of the feature IDs to one or more candidate strings which include the candidate features; and
      using a second tightly-packed list to store the feature IDs;
   receiving an input search string corresponding to a received search query of the collection;
   converting the input search string to one or more input features;
   hashing the input features;
   retrieving input feature IDs that correspond to the input features from the low-memory index; and
   determining target IDs corresponding to the plurality of candidate strings.

2. The method of claim 1, wherein the one or more candidate features comprise character n-grams.

3. The method of claim 1, further comprising storing postings comprising string/object pairs, the transforming further comprising using a third tightly-packed list to store objects of the postings.

4. The method of claim 1, further comprising storing feature weights in the second tightly-packed list.

5. The method of claim 1, wherein the byte encoding comprises using a variable-length byte encoding for each integer value.

6. The method of claim 1, wherein the determining target IDs corresponding to the candidate strings comprises:
   calculating a guaranteed rank threshold (GRT);
   sorting candidate strings based on a similarity metric generated relative to a candidate string and the input search string; and
   determining candidate strings that have a similarity metric greater than the GRT.

7. The method of claim 6, wherein the GRT is iteratively calculated comprising:

$$GRT \leq \frac{I(r) - \sum_{n=1}^{i} I(f_n)}{w * I(r) + (1 - w) * \left(I(r) - \sum_{n=1}^{i} I(f_n)\right)},$$

wherein r represents an input string, I(r) represents self-information weights of input features of input string r, w is an input weight parameter.

8. The method of claim 6, further comprising presenting one or more of the candidate strings that have the similarity metric greater than the GRT as search results of the received search query to a user via a user interface.

9. A non-transitory computer readable medium having instructions stored thereon that, when executed by a processor, cause the processor perform string similarity search and analysis, the string similarity search and analysis comprising:
   receiving a plurality of candidate strings of a collection to be searched;
   transforming each candidate string into one or more candidate features;
   generating a feature index that maps each of the candidate features to one or more candidate strings which include the candidate features;
   transforming the feature index into a low-memory index comprising:
      byte encoding a sorted integer array into an encoded byte array;
      hashing each candidate feature to an integer value and storing using a tightly-packed map a hashed value to feature identification (ID) mapping;
      using a first tightly-packed list to map each of the feature IDs to one or more candidate strings which include the candidate features; and
      using a second tightly-packed list to store the feature IDs;
   receiving an input search string corresponding to a received search query of the collection;
   converting the input search string to one or more input features;
   hashing the input features;
   retrieving input feature IDs that correspond to the input features from the low-memory index; and
   determining target IDs corresponding to the plurality of candidate strings.

10. The non-transitory computer readable medium of claim 9, wherein the one or more candidate features comprise character n-grams.

11. The non-transitory computer readable medium of claim 9, further comprising storing postings comprising string/object pairs, the transforming further comprising using a third tightly-packed list to store objects of the postings.

12. The non-transitory computer readable medium of claim 9, further comprising storing feature weights in the second tightly-packed list.

13. The non-transitory computer readable medium of claim 9, wherein the byte encoding comprises using a variable-length byte encoding for each integer value.

14. The non-transitory computer readable medium of claim 9, wherein the determining target IDs corresponding to the candidate strings comprises:
calculating a guaranteed rank threshold (GRT);
sorting candidate strings based on a similarity metric generated relative to a candidate string and the input search string; and
determining candidate strings that have a similarity metric greater than the GRT.

15. The non-transitory computer readable medium of claim 14, wherein the GRT is iteratively calculated comprising:

$$GRT \leq \frac{I(r) - \sum_{n=1}^{i} I(f_n)}{w * I(r) + (1 - w) * \left(I(r) - \sum_{n=1}^{i} I(f_n)\right)},$$

wherein r represents an input string, I(r) represents self-information weights of input features of input string r, w is an input weight parameter.

16. The non-transitory computer readable medium of claim 14, further comprising presenting one or more of the candidate strings that have the similarity metric greater than the GRT as search results of the received search query to a user via a user interface.

17. A string similarity search and analysis system comprising:
one or more processors that are adapted to receive a plurality of candidate strings of a collection to be searched and transform each candidate string into one or more candidate features and generate a feature index that maps each of the candidate features to one or more candidate strings which include the candidate features; and
a storage device that stores a low-memory index that is transformed from the feature index by:
byte encoding a sorted integer array into an encoded byte array;
hashing each candidate feature to an integer value and storing using a tightly-packed map a hashed value to feature identification (ID) mapping;
using a first tightly-packed list to map each of the feature IDs to one or more candidate strings which include the candidate features; and
using a second tightly-packed list to store the feature IDs;
the processors further adapted to receive input search string corresponding to a received search query of the collection, convert the input search string to one or more input features, hash the input features, retrieve input feature IDs that correspond to the input features from the low-memory index and determine target IDs corresponding to the plurality of candidate strings.

18. The system of claim 17, wherein the one or more candidate features comprise character n-grams.

19. The system of claim 17, further comprising storing postings comprising string/object pairs, transforming the feature index further comprising using a third tightly-packed list to store objects of the postings.

20. The system of claim 17, further comprising storing feature weights in the second tightly-packed list.

* * * * *

UNITED STATES PATENT AND TRADEMARK OFFICE
CERTIFICATE OF CORRECTION

PATENT NO. : 10,691,753 B2  
APPLICATION NO. : 15/962020  
DATED : June 23, 2020  
INVENTOR(S) : Ogren et al.

It is certified that error appears in the above-identified patent and that said Letters Patent is hereby corrected as shown below:

In the Specification

In Column 8, Line 16, delete "ror" and insert -- r or --, therefor.

In Column 8, Line 56, delete "T." and insert -- τ. --, therefor.

In Column 9, Line 58, delete "x" and insert -- τ --, therefor.

In Column 16, Line 64, delete "below" and insert -- below. --, therefor.

In Column 21, Line 15, delete "structures" and insert -- structures. --, therefor.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*